United States Patent
Lieberman et al.

(10) Patent No.: US 10,706,414 B1
(45) Date of Patent: Jul. 7, 2020

(54) SYSTEM AND METHOD FOR TOKEN BASED MOBILE PAYMENT

(71) Applicant: JPMorgan Chase Bank, N.A., New York, NY (US)

(72) Inventors: Alex Lieberman, Marlboro, NJ (US); Nicholas M. Lore, Pearl River, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 525 days.

(21) Appl. No.: 15/148,509

(22) Filed: May 6, 2016

(51) Int. Cl.
*G06Q 20/36* (2012.01)
*G06Q 20/40* (2012.01)
*G06Q 20/32* (2012.01)
*G06Q 30/02* (2012.01)

(52) U.S. Cl.
CPC ..... *G06Q 20/3674* (2013.01); *G06Q 20/3224* (2013.01); *G06Q 20/3672* (2013.01); *G06Q 20/4016* (2013.01); *G06Q 20/40145* (2013.01); *G06Q 30/0226* (2013.01)

(58) Field of Classification Search
CPC ........... G06Q 20/3674; G06Q 20/3224; G06Q 20/3672; G06Q 20/40145; G06Q 20/4016; G06Q 30/0226
USPC .......................................................... 705/66
See application file for complete search history.

(56) References Cited

U.S. PATENT DOCUMENTS

| | | | | |
|---|---|---|---|---|
| 8,682,802 | B1* | 3/2014 | Kannanari | G06Q 20/367 705/64 |
| 8,751,391 | B2* | 6/2014 | Freund | G06Q 20/10 705/35 |
| 8,799,088 | B2* | 8/2014 | Rothschild | G06Q 20/04 235/380 |
| 9,195,984 | B1* | 11/2015 | Spector | G06Q 20/3821 |
| 9,246,899 | B1* | 1/2016 | Durney | G06Q 20/4014 |
| 2003/0028481 | A1* | 2/2003 | Flitcroft | G06Q 20/00 705/39 |
| 2012/0310826 | A1* | 12/2012 | Chatterjee | G06Q 20/36 705/41 |
| 2014/0012739 | A1* | 1/2014 | Wall | G06Q 20/383 705/39 |
| 2015/0026049 | A1* | 1/2015 | Theurer | G06Q 20/36 705/41 |
| 2015/0081567 | A1* | 3/2015 | Boyle | G06Q 20/3829 705/71 |
| 2015/0088739 | A1* | 3/2015 | Desai | G06Q 20/322 705/42 |
| 2015/0213443 | A1* | 7/2015 | Geffon | G06Q 20/3821 705/76 |

(Continued)

*Primary Examiner* — James D Nigh
(74) *Attorney, Agent, or Firm* — Hunton Andrews Kurth LLP

(57) ABSTRACT

The invention relates to a token-based mobile payment device comprising: a memory component that stores tokens and corresponding token use data; an interactive display that receives user input and in response to the user input, displays output data; a processor, coupled to the memory component and the interactive display, configured to perform the steps of: request a token to be transmitted to one or more recipients; identify an amount for the token and one or more restrictions on use of the token; communicating, via a wireless communication network, the token to the one or more recipients; and tracking the token and providing active token use data, via the interactive display.

18 Claims, 5 Drawing Sheets

(56) References Cited

U.S. PATENT DOCUMENTS

| | | | |
|---|---|---|---|
| 2015/0220963 A1* | 8/2015 | Priebatsch | G06Q 30/0238 |
| | | | 705/14.38 |
| 2015/0279130 A1* | 10/2015 | Robertson | G07C 9/00571 |
| | | | 340/5.61 |
| 2016/0092866 A1* | 3/2016 | Liberty | G06Q 20/3224 |
| | | | 705/41 |
| 2017/0300907 A1* | 10/2017 | Shanmugam | G06Q 20/405 |

* cited by examiner

SYSTEM AND METHOD FOR TOKEN BASED MOBILE PAYMENT

FIELD OF THE INVENTION

The invention relates generally to a system and method for token based mobile payment, and more particularly to a system and method that issues and manages temporary and restricted tokens for mobile payments and other types payments.

BACKGROUND OF THE INVENTION

Current token based payments are limited to an instantaneous one-time payment. Such payments are limited and provide no real incentive for customers to replace traditional forms of payment. Because current tokens lack flexibility and customization, customers are less inclined to embrace a form of payment different from traditional credit and debit cards. Moreover, current mobile pay systems require the storage of digital credit card numbers which may lead to security issues and a higher threat for potential fraud.

These and other drawbacks currently exist.

SUMMARY OF THE INVENTION

According to one embodiment, the invention relates to a token-based mobile payment device comprising: a memory component that stores tokens and corresponding token use data: an interactive display that receives user input and in response to the user input, displays output data: a processor, coupled to the memory component and the interactive display, configured to perform the steps of: requesting a token to be transmitted to one or more recipients: identifying an amount for the token and one or more restrictions on use of the token; communicating, via a wireless communication network, the token to the one or more recipients: and tracking the token and providing active token use data, via the interactive display.

The method may be conducted on a specially programmed computer system comprising one or more computer processors, mobile devices, electronic storage devices, and networks.

The invention also relates to method for implementing a token based mobile payment, the method comprising the steps of: storing, via memory component, tokens and corresponding token use data; receiving, via an interactive display, user input and in response to the user input, the interactive display provides output data; requesting, via a processor, a token to be transmitted to one or more recipients; identifying, via the processor, an amount for the token and one or more restrictions on use of the token; communicating, via a wireless communication network, the token to the one or more recipients; and tracking, via the processor, the token and providing active token use data, via the interactive display.

The computer implemented system, method and medium described herein can provide the advantage of token based mobile payment, according to various embodiment of the invention. The innovative system and method provide a secure and convenient way for customers to extend temporary and permanent tokens to various recipients with customized restrictions and security features. Another advantage that can be provided is customer loyalty and retention due to the increased satisfaction of the account holder. The system provides convenience and security for customers as they transact with various merchants and financial devices. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
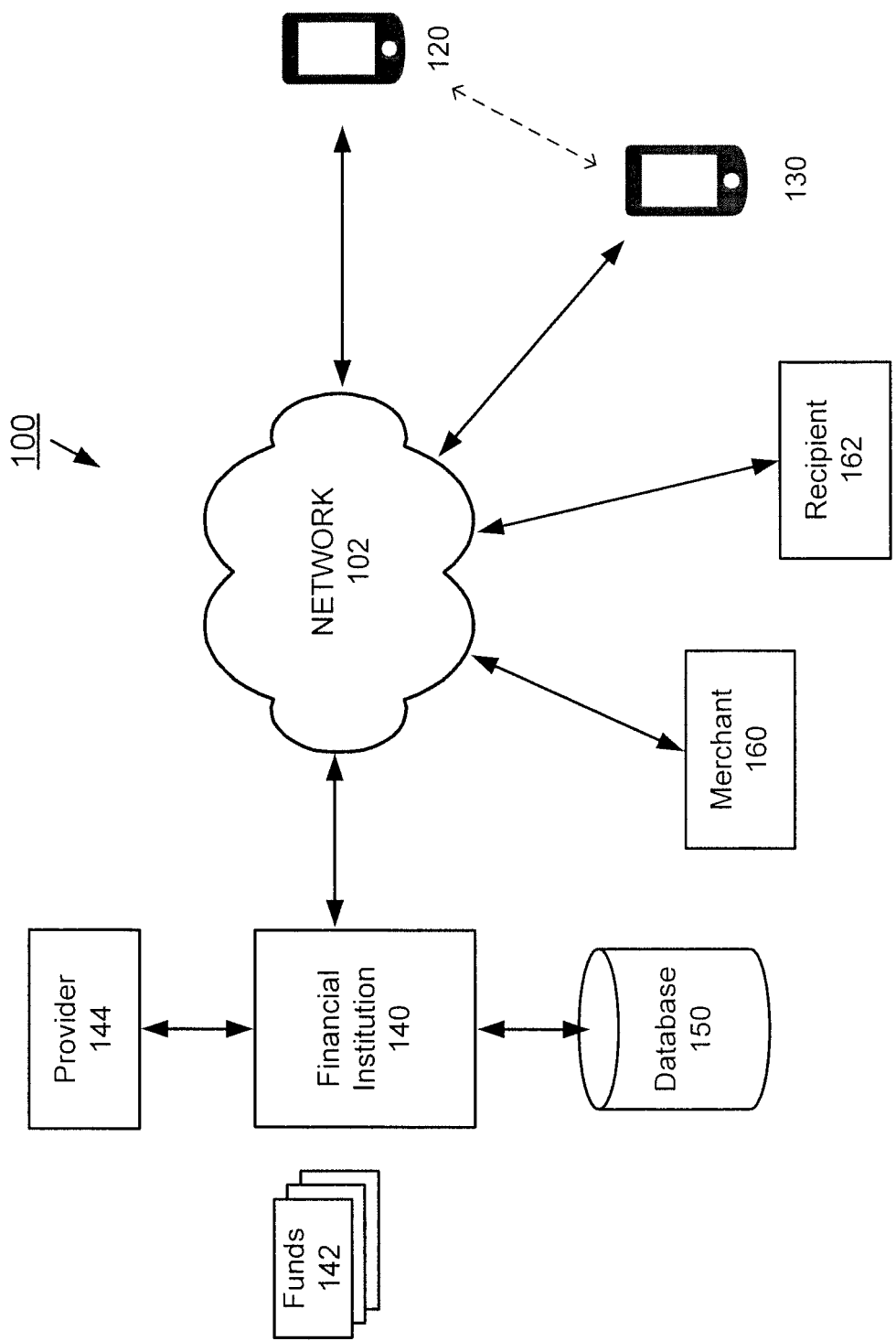
FIG. 1 is a diagram of a system for implementing token based mobile payments, according to an exemplary embodiment of the invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

There is an increasing need for mobile payment sharing that is not direct, and does not instantaneously transfer money from one source to another source, also known as time-restricted tokens or temporary tokens. An embodiment of the present invention is directed to time-restrained tokens that expire after a time period and automatically revert back to the original issuer's account. For example, an exemplary application may involve a parent giving a child the ability to have spending money or an allowance in the form of one or more tokens on a mobile device. In this example, the token is associated with a funding account of the parent, which may be a checking account or other funding instrument. The child, who does not own a bank account, may receive the token on a mobile phone or other device and use it as a form of payment within the boundaries and/or restrictions attributed to the token by the issuer, in this example, the parent. Accordingly, an embodiment of the present invention is directed to transferring tokens between people before it arrives at its final destination.

According to an embodiment of the present invention, a token may be issued with characteristics and/or restrictions. For example, the token may be active for a number of days from digital issuance, where the token has an associated purchase amount. The issuer may then communicate the token to a recipient, through a text message or other form of communication.

Another embodiment of the present invention is directed to tracking and managing the token's use. For example, a parent may issue tokens to multiple children. A first child may need money for gas on his way home from school. The token may be issued as a category specific token, e.g., transportation-related purchases. A second child may be given a token for an after-school activity. The parent may track each token's usage through an interface, which may be on a mobile device or other computer device. The parent may also schedule notifications or alerts for the token's usage, location, or any use that is beyond the scope of the token. For example, the first child may attempt to use the token for a non-transportation related purchase. An embodiment of the present invention may allow the purchase, but the parent may be notified, e.g., text message, phone call, alert, etc. For example, the purchase—while not a transportation related purchase—may be authorized because it's a grocery related purchase. The parent may also use the interface to review past purchases and perform budget analysis. For example, the token may also be issued with a spending limit or other budget restriction. Also, tokens may be transmitted to various recipients and entities, such as business partners, merchants, banks, service providers and/or other recipient.

Another embodiment of the present invention is directed to a token based checking system. In this example, an account holder may print out a check with a token that associates the check to an account.

The following descriptions provide different configurations and features according to exemplary embodiments. These configurations and features may relate to providing financial services through financial services machines. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

FIG. 1 illustrates a schematic diagram of a system 100 is shown, according to an exemplary embodiment. As illustrated, network 102 may be communicatively coupled with one or more devices including, for example, mobile device 120, mobile device 130, Financial Institution 140, Provider 144, Database 150, Merchant 160 and Recipient 162. The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, BLUETOOTH, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 shows a single or individual exemplary components and devices, it should be appreciated that there may be several of such devices to carry out the various exemplary embodiments.

The mobile devices 120, 130 may be associated with customers. For example, a customer may have one or more accounts with the financial institution, represented by 140. The customer may also be associated with other funding sources, shown by 142 including checking accounts, savings accounts, credit card, debit card, investment products (e.g., stocks, bonds, funds, etc.). The mobile devices 120, 130 may alternatively be a laptop computer, a personal digital assistant, a smartphone, a smartwatch, smart glasses, other wearables or other computing devices capable of sending or receiving network signals. The mobile devices 120, 130 may have an application installed that is associated with the financial institution, merchant, retailer, third party provider and/or other provider, represented by 144.

Financial Institution 140 may include various computer components, including one or more servers that perform operations associated with processing information and data associated with mobile devices 120, 130. In various exemplary embodiments, the server may be a specific computing device to support exemplary embodiments as described herein.

Financial Institution 140 may be communicatively coupled with one or more storage components, represented by Database 150. Database 150 may contain data and information used by the system 100. For example, Database 150 may store account data for customers, as well as customer profile data. Database 150 may also contain additional information related to the operation and administration of the system 100. Database 150 may include any suitable data structure to maintain the information and allow access and retrieval of the information. For example, Database 150 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Database 150 may be any suitable storage device or devices. The storage may be local, remote, or a combination thereof with respect to Database 150. Database 150 may utilize a redundant array of disks (RAID), striped disks, hot spare disks, tape, disk, or other computer accessible storage. In one or more embodiments, the storage may be a storage area network (SAN) an internet small computer systems interface (iSCSI) SAN, a Fiber Channel SAN, a common Internet File System (CIFS), network attached storage (NAS), or a network file system (NFS). The database 150 may have back-up capability built-in. Communications with the database 150 may be over a network, such as network 102, or communications may involve a direct connection between Database 150 and Financial Institution 140, as depicted in FIG. 1.

Merchant 160 may include a point of sale device. For example, the merchant may have a relationship with the financial institution such that the point of sale device 160 may be communicatively coupled, through the network 102, with Financial Institution 140 and Database 150. In various exemplary embodiments, Merchant 160 may include a server associated with an e-commerce website through with customer's conduct on-line transactions. In various exemplary embodiments, the point of sale device may be a physical device located at a merchant's location. A point of sale device associated with Merchant 160 may also include a reader (e.g., NFC, BLE, WiFi, LTE, etc.) to establish wireless communication with mobile devices.

Having described an example of the hardware, software, and data that can be used to run the system, an example of the method and customer experience will now be described. The method will be described primarily as an example in which a customer downloads a software application (sometimes referred to as an "app") and uses it to perform banking transactions and/or other functionality, including making purchases. However, those skilled in the art will appreciate that the principles of the invention can be applied to related circumstances, such as where the entity providing the app is a business other than a merchant, or where the merchant app functionality is provided through a browser on the customer's mobile device rather than through a software application (app) downloaded to the customer's mobile device, and with purchases from various providers.

Figure 2:
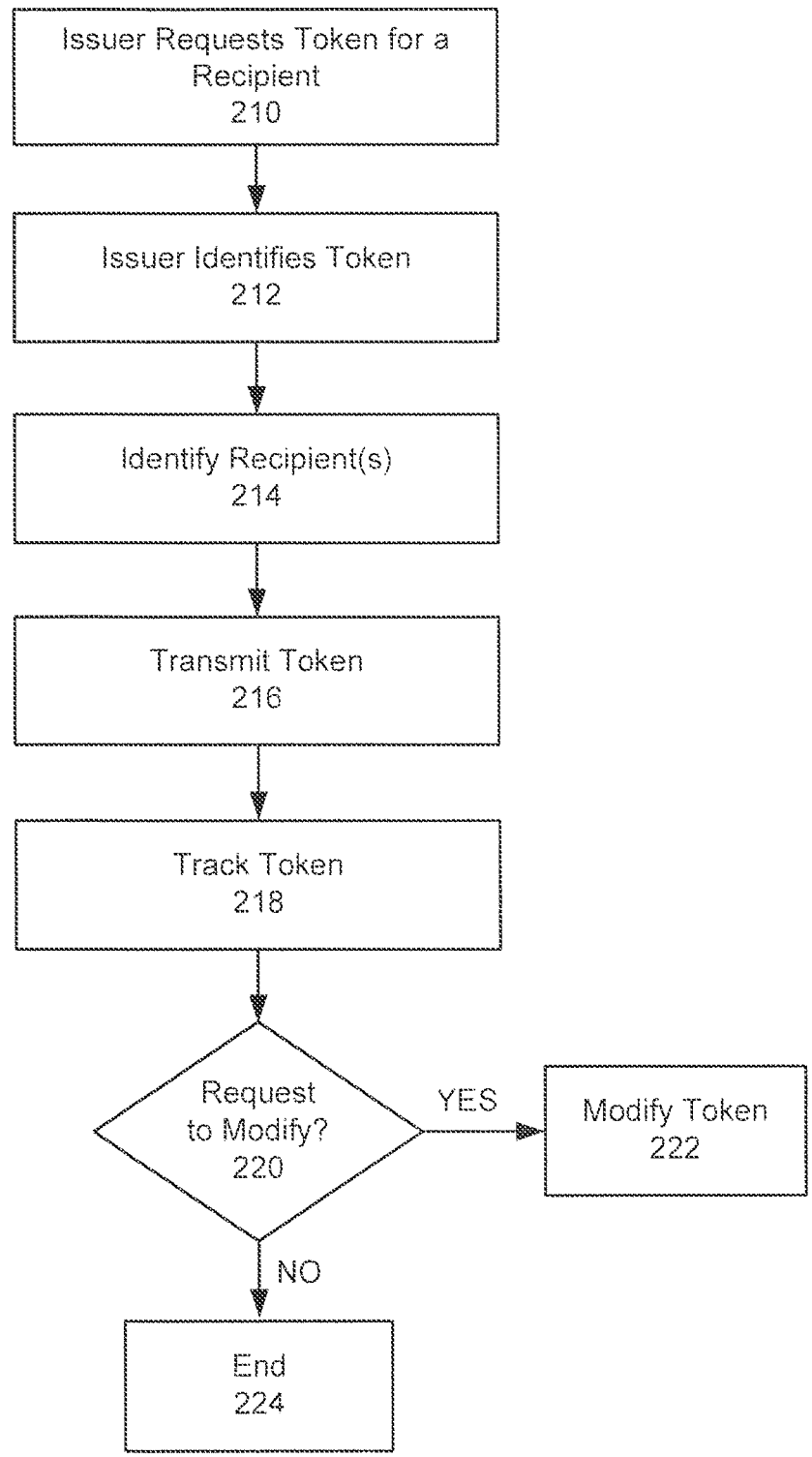
FIG. 2 is an exemplary flowchart of a method for issuing a token for mobile payment, according to an embodiment of the present invention.

FIG. 2 is an exemplary flowchart of a method for issuing a token for mobile payment, according to an embodiment of the present invention. At step 210, an issuer requests a token for a recipient. At step 212, issuer identifies the token. At step 214, the issuer identifies a recipient of the token. At step 216, the issuer transmits the token or makes it available. At step 218, the issuer may track the token. At step 220, an embodiment of the present invention may determine whether a request to modify has been received. At step 222, the issuer may modify the token. At step 224, the process may end. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, an issuer may request a token for a recipient. The issuer may request a token via a mobile device (e.g., using an app), a desktop computer, financial institution, provider website, etc. The issuer may request a temporary token, recurring token, token based on a predetermined schedule, and/or other type of token. An embodiment of the present invention is directed to enabling a customer issue a token to another recipient for future use, e.g., transaction, purchase, payment, recurring payment, access, etc. For example, a user may designate a token for recurring electronic bills to a specific utility company on a periodic basis. Other tokens may have a specific time duration, e.g., four years for a student in college. The token may be applied to various other environments, including a bank teller, merchant, airport, travel, government entities, hospital, medical services, and/or other scenarios that involve payment, access or transaction.

For example, the token may also enable a customer to gain access to buildings, areas, concerts, performances, etc. According to an embodiment of the present invention, the token may be used to access items, such as safety deposit boxes, temporary boxes, or other financial instrument. An embodiment of the present invention is directed to a token that can be passed around to multiple recipients. In this example, a database maintains state of who has the token and its use.

At step 212, the issuer may identify the token. For example, the issuer may specify how the token can be used by the recipient. The customer may issue a particular type of token or select from a category of tokens. The customer may also identify unique characteristics as well as restrictions of use. An embodiment of the present invention may provide various different levels of restrictions for the token. The token may be used once, or multiple times during a time period, until a condition is met or until an event occurs. Also, the token may have a geographic restriction, where the token is only valid within an area, radius or other geofence associated with a specific merchant or category of merchants and/or other location or geographic based qualifier. For example, the token issued to a college student may only be valid on campus and within 10 miles of campus. The token may also be valid for only meal purchases, and other valid merchants. In addition, the token may exclude certain purchases and/or merchants. The location restriction may be based on the mobile device location. Moreover, the location may be predetermined, user defined, variable, etc. According to another example, the token may be restricted to in-person purchases where the token is not valid for online or phone purchases. According to yet another example, a token may be valid only at specific merchants, category of merchants, category of purchases, purchases under a set transaction amount, etc.

Other restrictions or characteristics may include the amount of funds that may be transacted, how many transactions, type of transaction, threshold dollar amount, etc. Also, an embodiment of the present invention may recognize a higher level of confidence and security for some customers, transactions, geographic locations, etc. For example, a customer may provide (or may be requested to provide) an additional level of authentication where the customer provides a biometric credential (e.g., fingerprint, facial expression, voice recognition, swipe pattern etc.), answers one or more security questions, etc. This customer may then experience a higher level of privileges and may thereby override certain restrictions or constraints.

According to another example, the amount of funds associated with the token may be variable and/or conditional. Also, the token may be eligible for an increase depending on certain factors, e.g., type of valid or necessary transactions including gas purchases, grocery purchases, nominal amount, valid merchants, etc. An issuer may preset the token to be approved for emergency, valid and/or necessary requests.

Restrictions may be applied by an embodiment of the present invention based on fraud and/or other concerns. For example, restrictions may be automatically applied in response to fraud alert or fraud analysis and may be further customized based on various factors, e.g, customer profile, geographic location, transaction history, suspect merchants, online websites, etc. Other security features may be applied. For example, based on the results of the, internal security analysis, additional security measures may be implemented or not. For example, if a customer is unable to immediately verify or answer a security question, additional restrictions may apply. Rather, than cancelling access, an embodiment of the present invention may provide restrictions on the transaction (e.g., dollar limit, time limit, etc.) and/or closely monitor activity for potential fraud analysis.

At step 214, the issuer may identify a recipient of the token. The recipient may include anyone with a mobile device identifier, e.g., phone number, email address, etc. The recipient may be an individual, employer, merchant, company, account, financial institution, etc.

At step 216, the issuer may transmit the token or make it available to the recipient. The token may be communicated to a recipient via various modes of communication. For example, the token may be transmitted via a reader, display, panel and/or other input or interface. Also, the token may be transmitted by the mobile device to a reader or another receiving device. For example, a mobile device may communicate a use code via NFC, BTE, over the air, etc. to a reader. Also, a token may be provided via a phone conversation, IVR, text message, SMS, email, a website (e.g., social media website, bank website, private message, etc.), in person, bank teller, merchant, service representative and/or other mechanism that is able to verify a customer's identity. Also, third party apps or channels may include merchant apps, social media apps, trusted groups and/or other third party apps. The token may be generated, retrieved, selected and/or otherwise made available using a mobile app on a mobile device. In addition, the token may be printed in machine readable code or image, which may be later scanned or otherwise recognized.

At step 218, the issuer may track the token. For example, the issuer may access a user interface to view real time data regarding the token's use, location and/or other characteristic. The issuer may also view geographic data, e.g., map, with various views, such as 2D map view. 3D map view, interactive map view, etc. Also, the issuer may also view historical data regarding the token, including past purchases, past locations, etc.

According to an exemplary scenario, an issuer may provide a token to a recipient where the issuer is a loyalty reward member. In this example, when the token is used by the recipient to make purchases at a participating merchant, the loyalty points earned by the recipient may be credited to the issuer. According to another example, the issuer may indicate that the loyalty points are credited to the recipient, towards an account (e.g., savings account), and/or other designed receiving entity. Also, the issuer and the recipient may split or share loyalty points. In this example, for certain merchants, the points may be credited to the issuer (e.g., credit for grocery points) whereas points for other merchants may be given to the recipient (e.g., credit for gas station points). Other variations may be implemented.

At step 220, an embodiment of the present invention may determine whether a request to modify has been received. The request may be received from the recipient. Also, the request may be received from the system itself, through a machine learning component based on prior use and other transaction related data (e.g., increase or decrease in costs, price, expenses, etc.).

At step 222, the issuer may modify the token. The issuer may approve requests for modification or increase from the recipient of the token. For example, at issuance, the issuer may indicate that certain purchases will be approved even if the purchases are outside of the current limitations of the issuing token. Also, the issuer may indicate that approval is required to complete the transaction. In this case, the issuer may receive a notification, alert or other request for token amount increase. According to another example, an embodiment of the present invention may include a machine learning aspect of the system that may prompt the issuer for a modification based on the token's use. For example, the token may be issued to a student for meal purchases. The system may learn that the price for certain meals have increased or decreased and thereby suggest a corresponding modification that captures the price change. Also, the student may have changes in eating habits based on a new part time after school job so the student is now purchasing a snack after school and thereby requires a funds increase on the token. The system may automatically provide this increase or suggest the increase to the issuer for approval.

Figure 3:
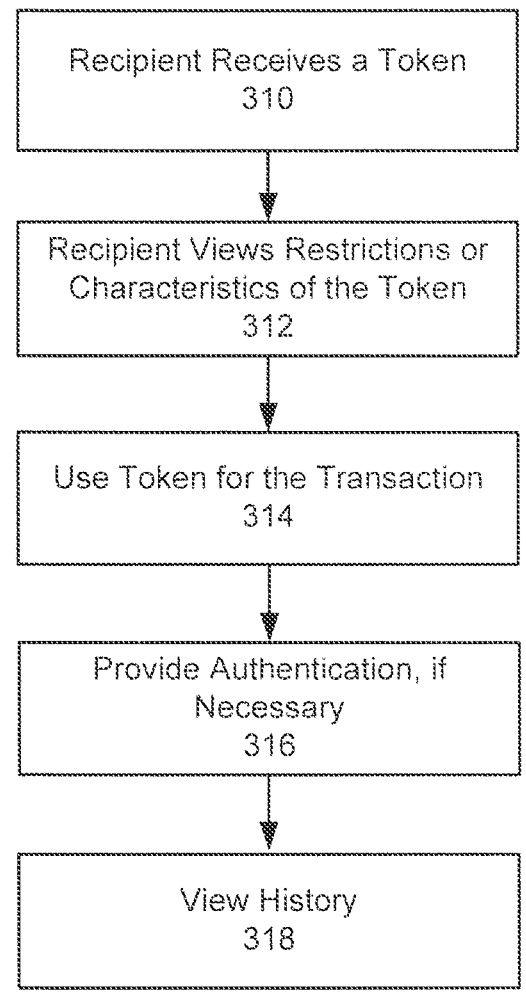
FIG. 3 is an exemplary flowchart of a method for accepting a token for mobile payment, according to an embodiment of the present invention.

FIG. 3 is an exemplary flowchart of a method for accepting a token for mobile payment, according to an embodiment of the present invention. At step 310, a recipient receives one or more tokens. At step 312, the recipient may view the token. At step 314, the recipient may use the token. At step 316, the recipient may provide additional authentication, if necessary. At step 318 the recipient may view historical data. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, a recipient may receive one or more tokens. The recipient may receive tokens at the recipient's mobile phone or other mobile device. Specifically, the recipient may receive the token directly into the recipient's electronic wallet. The recipient may also receive tokens from multiple issuers for different purposes. For example, the recipient may manage the multiple tokens through a user interface, e.g., electronic folders, pockets, etc. The recipient may organize multiple tokens based on restrictions, categories, use, etc. Also, the recipient may merge tokens into a single token for a common purpose, for example, or based on other factor.

At step 312, the recipient may view or access the token. Upon receiving the token, the recipient may view certain characteristics, restrictions and/or other data associated with the token. The recipient may also request modification, e.g., additional funds, higher limit, extension of time, etc.

At step 314, the recipient may use the token for a transaction or other exchange. For example, the recipient may use the mobile device to make a purchase at a merchant, for example. When the recipient is ready to make a transaction, the recipient may select a token for use. If the recipient has multiple tokens, the recipient may select an appropriate token. Also, an embodiment of the present invention may automatically select the appropriate token or suggest a token for use based on the recipient's location, habit, profile data, etc. For example, if the recipient is at a grocery store, the mobile device may automatically use the token that applies to the purchases to be made.

At step 316, the recipient may provide additional authentication, if necessary. According to another example, if the purchase involves a high dollar amount or the potential for fraud is high, an embodiment of the present invention may request additional authentication. This may occur in various ways, e.g., password, PIN, biometric, credentials, etc.

At step 318, the recipient may view historical data. Similar to the issuer, the recipient may access a user interface to view token usage and remaining balance data.

Figure 4:
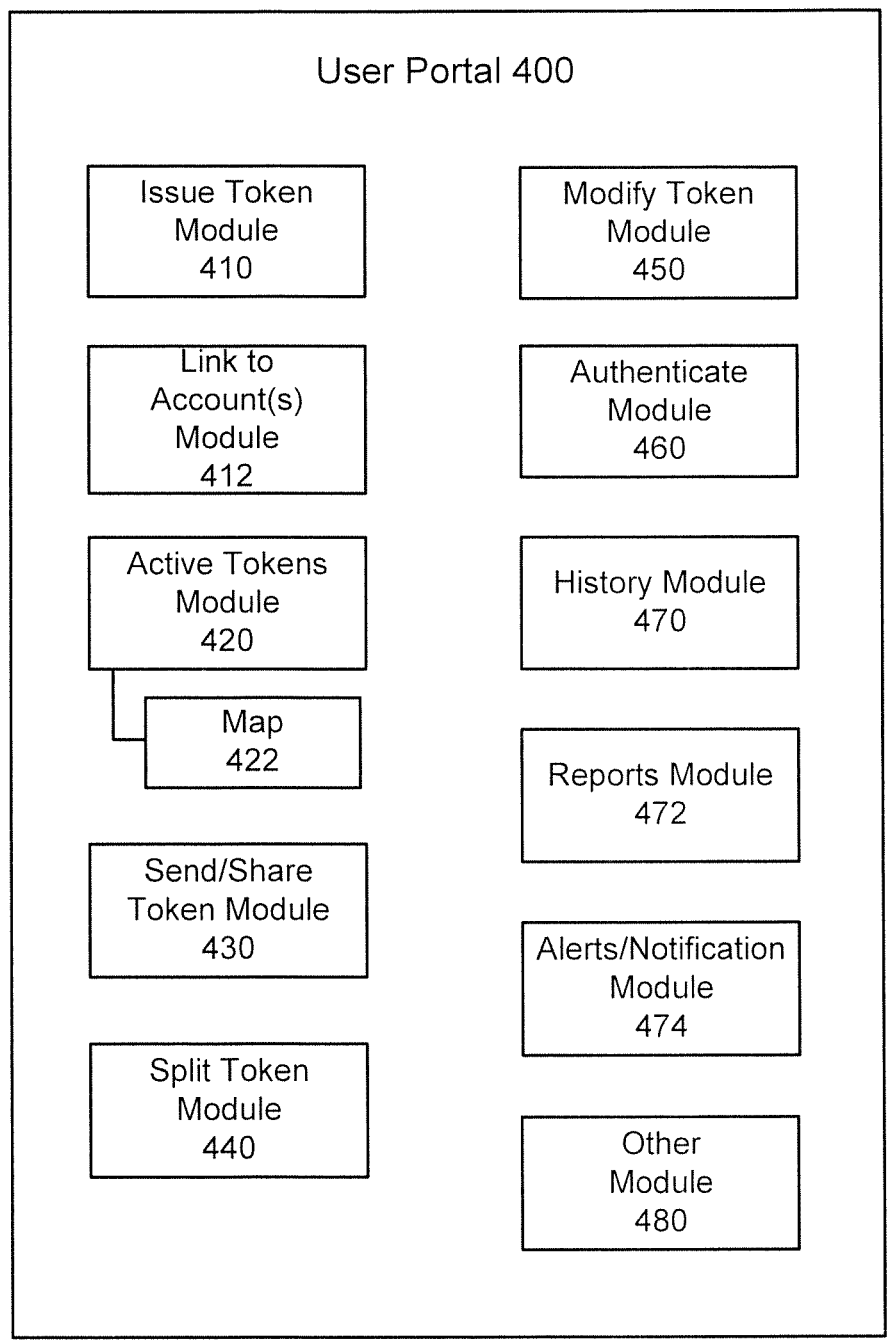
FIG. 4 is an exemplary illustration of a user portal for token management, according to an embodiment of the present invention.

FIG. 4 is an exemplary illustration of a user portal for token management, according to an embodiment of the present invention. User Portal 400 may be accessible via a mobile device, desktop device and other computing device, processor or system. User Portal 400 may include various modules that perform token management functionality. For example, User Portal 400 may include Issue Token Module 410, Link to Account(s) Module 412, Active Token Module 420, Send/Share Token Module 430, Split Token Module 440, Modify Token Module 450. Authenticate Module 460, History Module 470, Reports Module 472, Alerts/Notification Module 474 and Other Module 480. These modules are exemplary and illustrative, the User Portal may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

An embodiment of the present invention is directed to enabling a digital wallet to receive, store and manage various tokens, which may then be linked to a database or other memory component. For example, only one side of transaction may need digital access, where the two mobile devices may use that singular access to check the database and pass tokens and perform other actions on the token. Also, the token may be stored offline (e.g., saved on a mobile device, etc.) where digital access may not be required.

Issue Token Module 410 may enable a user to issue a token to another recipient. The user may select from various types of tokens as well as customize a token with specific characteristics, restrictions and/or functions. For example, the user may issue a temporary token, a permanent token and tokens with restrictions, e.g., timing expiring (e.g., Hold on Funds, temporary, etc.); time windows (e.g., only good on day X or hour X); good as cash (e.g., Limit On Token Size); frequency of recurrence control; one time PIN for certain types of tokens (e.g., remake a new PIN each time) for when a connection is down; transfer via one data connection instead of both parties; modify on-the-fly (e.g., for certain types); notifications to modify, add, subtract, increase, decrease, etc.; machine learning for new token, modification; activation by geolocation; transferable by wireless, email, text, etc.

According to an embodiment of the present invention, temporary tokens may include hold on funds whereas permanent tokens involve a complete withdrawal of funds. This may be useful for parents and children, employer and employee, etc. For example, this may be used in scenarios involving a loan with tracking (e.g., business, personal, etc.), etc. The token may be transferred to a recipient, via various forms of communication, including NFC, email, text, and/or wireless communication to a mobile phone. The user may track the amounts used, in Active Tokens Module 420. Tokens may be retrieved at any time by the issuer. The hold on funds token may be directly linked to a bank account (or other funding source), which may be accessed at 412. The user may also restrict transferability where the token may not be transferred to more than the one recipient or restricted to a specific category of recipients. A database or other memory component may maintain state data regarding who has the token along with past and current use.

Another type of token may include a check based token. This type of token may be deposited into a bank account, accessible via 412. The token may have any amount, including a variable amount, contingent amount, etc. In this example, the token may be issued to a name or an identifier, with a monetary amount. In this scenario, the token's transferability may be restricted to a one-to-one relationship (e.g., may not be passed around). Also, the token may be cancelled at any time before deposit. For example, if the token is misused, flagged as fraudulent, or somehow stole, the token may be cancelled prior to its use. By linking the token to an account, an embodiment of the present invention may retrieve tokens stored on lost phones, digital wallets, etc.

An embodiment of the present invention is directed to a token recognized as a physical representation of cash itself. In this example, funds may be withdrawn from an account and associated with the token, which then becomes like cash. Upon issuance and/or acceptance, the token may be transmitted to a digital wallet or other receiving device.

An embodiment of the present invention may support a payment exchange process. In this example, tokens may be exchanged during transactions for smaller tokens. According to an exemplary scenario, at least one party may need a data connection to pass a token. A database of an embodiment of the present invention may track each instance the token is passed around. This data may be used for ownership verification. Accordingly, the database maintains and records relationships, amounts and/or other related data.

An embodiment of the present invention may implement tokens with preset denominations, e.g., 1, 2, 3, 4, 5, 11, 17, 23, 29, 35, etc. For the continued list, an embodiment of the present invention may add six to the last number or use formula (6K−1), where k is any number greater than 1. According to another example, the token may have a variable amount or a contingent amount based on an event or other threshold. Other variations may be realized.

An embodiment of the present invention may include a threshold amount for a token. For example, a token have a maximum amount on how much cash may be converted into tokens and how much a user can hold in an electronic wallet at once. Other restrictions may be applied.

An embodiment of the present invention may be directed to tokens for a specific type of transaction, e.g., in person, merchant location, online, web-based, phone, etc. An embodiment of the present invention may also support printable tokens with certain controls (e.g., valid merchant, category, location, short expiration time, etc.).

Link to Account(s) Module 412 provides access or a link to accounts that support or fund the tokens as well as accounts that receive the tokens. A user may verify that the tokens were issued and/or deposited properly. Accounts may include financial institution accounts, as well as any type of funding account (e.g., credit account, debit account, financial instrument, investment tool, payment mechanism, etc.). Also, tokens may not be directly related to an account, e.g., debit account, credit account. The tokens may be universal for any financial instrument. Accordingly, tokens may be generated via credit as well as via debit.

Active Token Module 420 may enable a user to view, manage, access and modify active tokens, as the issuer as well as the recipient. This module may provide a user with the ability to track active tokens on a map 422. Other users with authorization may also view, manage, access, and modify active tokens. For example, Active Token Module 420 may include a user interface where tokens may be sorted and/or filtered by attributes, e.g., date of expiration, location, amount, and other attributes. The tokens may also be grouped or otherwise organized on pages, folders, etc. based on various factors, including whether the tokens are permanent, temporary, on the wallet or given on another wallet.

Send/Share Token Module 430 may enable a user to transmit an issued token to a recipient. The token may be transmitted from a mobile device to another mobile device. Also, the token may be issued from a desktop computer to a recipient's mobile or other device. The token may be issued from a computing device to pay for a recurring payment on a periodic or other basis. The issuer may send the token, or make the token available to a recipient. Other forms of communication may be realized.

Split Token Module 440 may enable a user to split an existing token. For example, the user may split a larger token into smaller denominations for multiple payments or other uses.

Modify Token Module 450 may enable an issuer to modify characteristics of a token. Also, a recipient may request for a modification. Further, an embodiment of the present invention may automatically modify the token based on machine learning and/or other determination based on spending and other habits. For example, a user may preset qualifications that automatically modify a token (e.g., emergency purchases, government fees, etc.)

Authenticate Module 460 may enable a recipient to request a one-time PIN or other authorization code associated with the token. Other forms of additional authentication, credentials and/or security may be implemented. Also, Authenticate Module 460 may provide one time PIN for a token for when a connection is down, for example.

History Module 470 may interface with a memory component, including one or more databases, for example. History Module 470 may capture and/or record token relationships. Accordingly, an embodiment of the present invention may send notifications, alerts, suggestions, reminders and/or other information based on relation, frequency and/or other data. For example, a parent may issue a token to a child every Monday so that when the parent forgets, the parent may receive a notification.

An embodiment of the present invention is directed to a machine learning function that analyzes historical data from various sources, e.g., different accounts, and suggests tokens as well as modifications to existing tokens. The machine learning functionality may also retrieve data from social media accounts, GPS data, mobile device data as well as merchant data, transaction data. For example, if a user has frequent or periodic check ins, an embodiment of the present invention may recognize user frequency and suggest a customized or appropriate token for such purchases.

Reports Module 472 may enable a user to generate reports based on past transactions, uses, purchases and/or other considerations. Reports may be generated for tracking, budget and/or other purpose for an individual, family, business, corporation, etc.

Alerts/Notification Module 474 may provide a user with alerts, notifications, messages, warnings based on preset conditions as well as results based on machine learning and/or other considerations. Alerts may be communicated via the app on a mobile device, as well as other forms of communication, including text message, phone call, email, etc.

Figure 5:
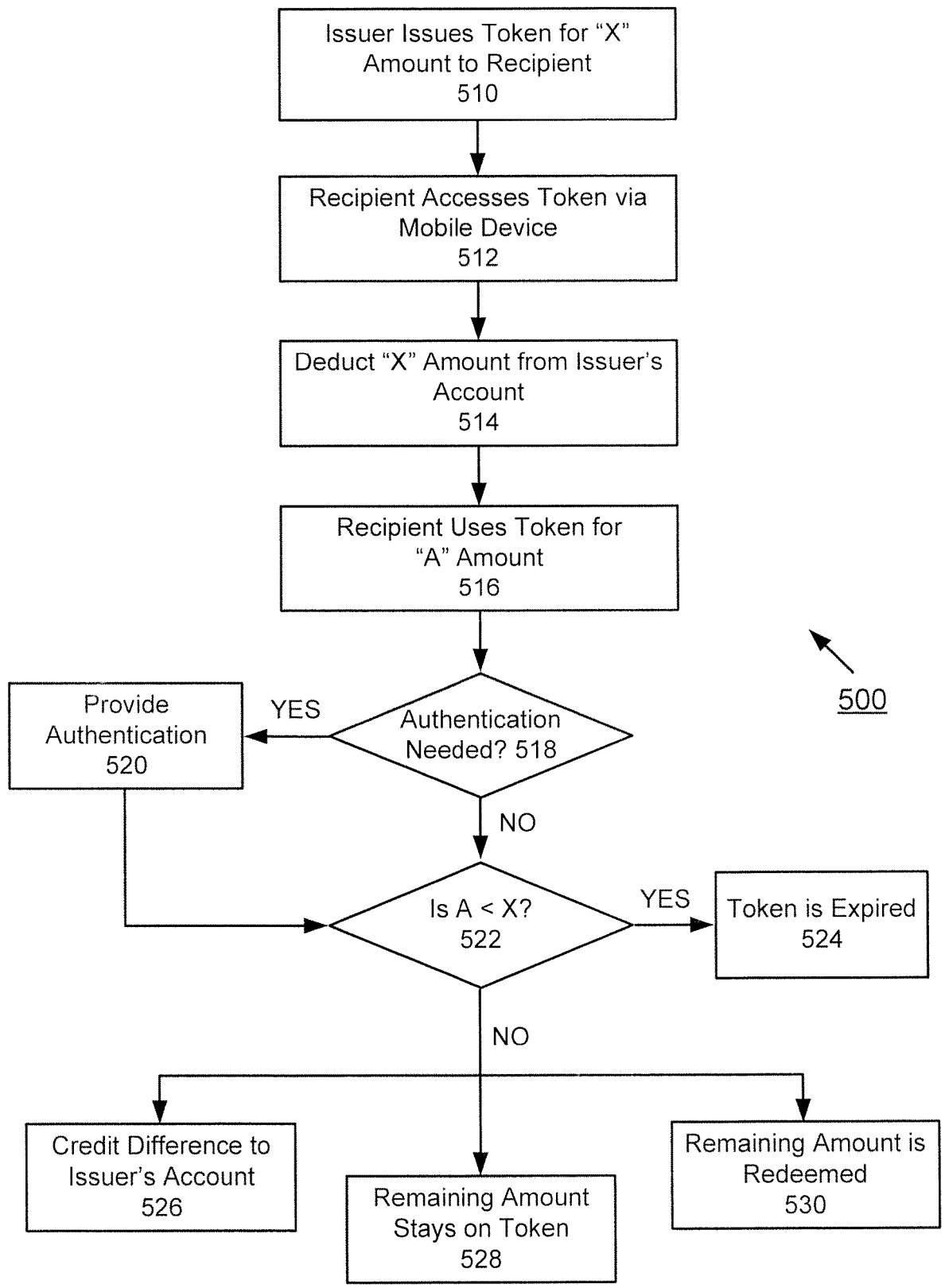
FIG. 5 is an exemplary flowchart illustrating token based mobile payment, according to an embodiment of the present invention.

FIG. 5 is an exemplary flowchart illustrating token based mobile payment, according to an embodiment of the present invention. At step 510, an issuer may issue a token for "X" amount to a recipient. At step 512, the recipient may access the token via a mobile device. At step 514, an embodiment of the present invention may deduct "X" amount from the issuer's account. At step 516, the recipient may use the token for a transaction or other authorized use for "A" amount. At step 518, an embodiment of the present invention may determine whether authentication is required. At step 520, authentication may be provided. At step 522, an embodiment of the present invention may determine whether the amount of transaction amount ("A") is less than the token amount ("X"). If yes, the token has expired, at step 524. If no, an embodiment of the present invention may credit the difference to the issuer's account, as shown by 526; the remaining amount may stay on the token, as shown by 528, or the remaining amount may be redeemed as a smaller denomination token, cash, etc., as shown by 530. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed.

Although the foregoing description has focused primarily on a financial institution assembling relevant data sets, processing the data, and sending the relevant data at appropriate times to its customer, the system may be operated and maintained by other types of commercial entities who may configure the system to provide similar advantages to their customers. In additional, while the foregoing description has focused primarily on the customer spend, the principles of the invention can be applied to other vendors and entities where the operating entity can assemble and provide relevant, timely information to enhance the customer's experience.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of servers 140 and user communication devices 120, 130, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud) or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A token-based mobile payment device comprising:
   a memory component that stores tokens and corresponding token use data;
   an interactive display that receives user input and in response to the user input, displays output data;
   a processor, coupled to the memory component and the interactive display, configured to perform the steps of:
   requesting an indirect sharing of money in the form of a token to be transmitted to one or more non-merchant recipients for use with a merchant to purchase goods or services;
   identifying an amount for the token and a plurality of restrictions on use of the token, the restrictions comprising a time until token expiration and at least one of a limitation on how and where the token may be used;
   providing, via a wireless communication network, the token to the one or more non-merchant recipients for use by the non-merchant recipient consistent with the one or more restrictions;
   tracking the token and providing active token use data, via the interactive display;
   providing, via the interactive display, a request for a modification to the token;
   receiving, via the interactive display, an approval of the request for a modification to the token; and
   wherein the processor executes a machine learning algorithm that automatically modifies the token based on historical data associated with the one or more recipients and token use history.

2. The token-based mobile payment device of claim 1, wherein the plurality of restrictions on use of the token comprise a geographic boundary.

3. The token-based mobile payment device of claim 1, wherein the plurality of restrictions on use of the token comprise a specific category of use, selected by an issuer of the token.

4. The token-based mobile payment device of claim 1, wherein the plurality of restrictions comprise any transactions are limited to in-person transactions.

5. The token-based mobile payment device of claim 1, wherein the processor receives a request to modify the amount of the token.

6. The token-based mobile payment device of claim 1, wherein the token is a temporary token.

7. The token-based mobile payment device of claim 1, wherein loyalty points earned by the token are credited to an issuer of the token.

8. The token-based mobile payment device of claim 1, wherein the token is modified automatically based on a detected fraud condition.

9. The token-based mobile payment device of claim 1, wherein the token is associated with an additional authentication feature that requires a biometric input from the one or more recipients.

10. A computer implemented method for implementing a token-based mobile payment device comprising the steps of:
    storing, via memory component, tokens and corresponding token use data;
    receiving, via an interactive display, user input and in response to the user input, the interactive display provides output data;
    requesting, via a processor, an indirect sharing of money in the form of a token to be transmitted to one or more non-merchant recipients for use with a merchant to purchase goods or services;
    identifying, via the processor, an amount for the token and a plurality of restrictions on use of the token, the restrictions comprising a time until token expiration and at least one of a limitation on how and where the token may be used;
    providing, via a wireless communication network, the token to the one or more non-merchant recipients for use by the non-merchant recipient consistent with the one or more restrictions; and
    tracking, via the processor, the token and providing active token use data, via the interactive display;
    providing, via the interactive display, a request for a modification to the token;
    receiving, via the interactive display, an approval of the request for a modification to the token; and
    executing, via the processor, a machine learning algorithm that automatically modifies the token based on historical data associated with the one or more recipients and token use history.

11. The method of claim 10, wherein the plurality of restrictions on use of the token comprise a geographic boundary.

12. The method of claim 10, wherein the plurality of restrictions on use of the token comprise a specific category of use, selected by an issuer of the token.

13. The method of claim 10, wherein the plurality of restrictions comprise any transactions are limited to in-person transactions.

14. The method of claim 10, wherein the processor receives a request to modify the amount of the token.

15. The method of claim 10, wherein the token is a temporary token.

16. The method of claim 10, wherein loyalty points earned by the token are credited to an issuer of the token.

17. The method of claim 10, wherein the token is modified automatically based on a detected fraud condition.

18. The method of claim 10, wherein the token is associated with an additional authentication feature that requires a biometric input from the one or more recipients.

* * * * *